(12) United States Patent
Harrison et al.

(10) Patent No.: US 6,461,141 B1
(45) Date of Patent: Oct. 8, 2002

(54) CAM TRACK WITH ADJUSTABLE PRE-RELEASE

(75) Inventors: Kevin R. Harrison, New Madison; Jeffrey P. Roark, Eaton, both of OH (US)

(73) Assignee: Wentworth Mold, Inc., Electra Form Industries Division, Vandalia, OH (US)

( * ) Notice: Subject to any disclaimer, the term of this patent is extended or adjusted under 35 U.S.C. 154(b) by 0 days.

(21) Appl. No.: 09/726,743

(22) Filed: Nov. 30, 2000

(51) Int. Cl.[7] .............................................. B29C 45/40
(52) U.S. Cl. ...................... 425/556; 425/444; 425/572; 425/DIG. 5
(58) Field of Search ................................ 425/556, 572, 425/DIG. 5, 444

(56) References Cited

U.S. PATENT DOCUMENTS

| | | |
|---|---|---|
| 5,531,588 A | 7/1996 | Brun, Jr. et al. |
| 5,653,934 A | 8/1997 | Brun, Jr. et al. |
| 5,681,595 A | 10/1997 | Travaglini |
| 5,707,662 A | 1/1998 | Bright et al. |
| 5,736,173 A | 4/1998 | Wright et al. |
| 6,065,950 A * | 5/2000 | Spiess ......................... 425/556 |
| 6,095,788 A | 8/2000 | Van Manen et al. |
| 6,101,791 A | 8/2000 | Louviere |
| 6,123,538 A | 9/2000 | Kutalowski |
| 6,171,541 B1 | 1/2001 | Neter et al. |

FOREIGN PATENT DOCUMENTS

GB  2343409 A  5/2000

\* cited by examiner

Primary Examiner—Tim Heitbrink
(74) Attorney, Agent, or Firm—Brinks Hofer Gilson & Lione

(57) ABSTRACT

An adjustable cam track for a mold assembly including a first mold portion, a second mold portion movable with respect to the first mold portion, a third mold portion movably interposed between the first and second portions and having at least one pair of space defining surfaces which together with the first and second mold portions defines in a closed position space for receiving plastic material to form at least one molded article. The adjustable cam track includes a guide coupled to the second mold portion, the guide defining a first portion of the adjustable cam track and a cam insert including a second portion of the adjustable cam track defining a point of release of the molded article from the space defining surfaces, the cam insert being adjustably positionable with respect to the guide to adjust the point of release. The first portion of the cam track also includes a ramp to an intermediate portion defining a pre-release position of the space defining surfaces so that the molded article is loosely retained by the space defining surfaces from time the cam follower engages the ramp defining the onset of prerelease until the cam follower reaches the point of full release to facilitate placement of the molded article into an article receiver inserted into the interval between the first mold portion and the molded article at the culmination of the molding cycle.

11 Claims, 4 Drawing Sheets

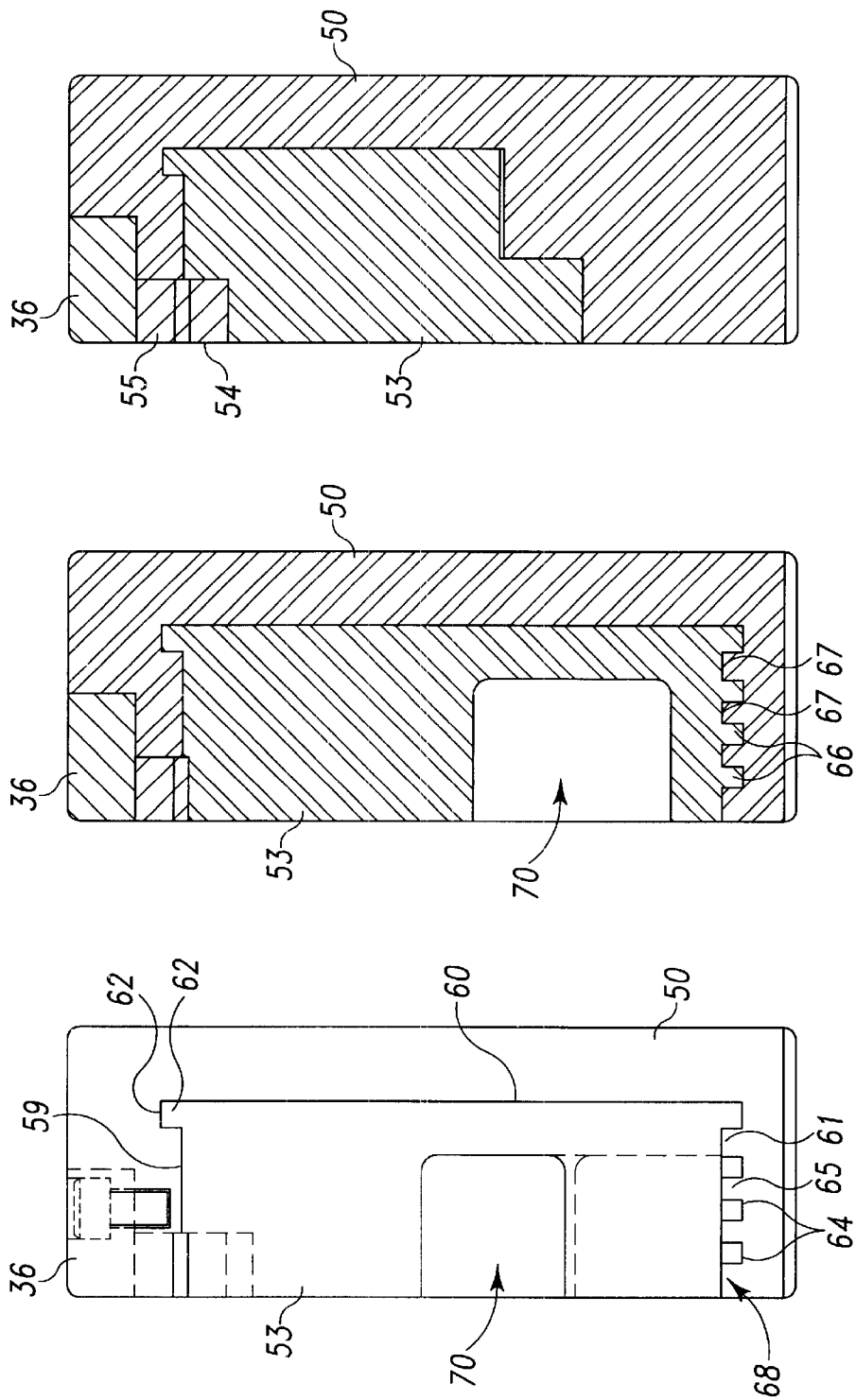

CAM TRACK WITH ADJUSTABLE PRE-RELEASE

BACKGROUND OF THE INVENTION

The present invention is directed generally to molds for use in injection molding machines and to guide elements for guiding relative movement of some portions of the molds with respect to other portions. The present invention is more particularly related to guides for use in three portion molds consisting essentially of a mold cavity assembly, a mold core assembly and an intermediate assembly including space surface defining elements that cooperate with the mold core and cavity assemblies to define the space in which articles are molded of plastic, the guides regulating the movement of the space surface defining elements during movement of the intermediate assembly relative to the other portions of the mold. The invention has particular utility in a molding machine used in conjunction with a molded article receiver unit designed to enter into an interval or opening between the mold cavity assembly and the other mold assemblies subsequent to formation of the molded article wherein the invention permits adjustment of the position and/or timing of release of the molded article from the intermediate assembly into the molded article receiver unit.

Brun, Jr., et al., U.S. Pat. No. 5,531,588 discloses an adjustable cam track for an injection molding machine having a base, the machine including a mold having a mold cavity assembly, a mold core assembly that is movable relative to the mold cavity assembly, and a stripper assembly movably interposed between the mold core and cavity assemblies. The stripper assembly has at least one pair of space defining surfaces which together with the mold cavity and core assemblies defines at least one space for receiving plastic material injected therein to form at least one molded article. A first motive means moves the mold core assembly and the stripper assembly away from the mold cavity assembly to remove the at least one molded article from the mold cavity assembly. A second motive means separates the mold core assembly and the stripper assembly to remove the at least one molded article from the mold core assembly. The adjustable cam track of Brun, Jr., et al., comprises generally a guide fixed to the stripper assembly. A cam follower is coupled to the space defining surfaces of the stripper assembly platen and engaged in the adjustable cam track for causing relative movement of each pair of space defining surfaces to release the molded article from the molding machine. The adjustable a cam track also includes a cam insert that is adjustably positionable with respect to the guide to adjust the point of release of the molded article. The cam insert includes a first toothed rack, and a second toothed rack removably fixed to the guide and engaging the first toothed rack to fix the position of the cam insert relative to the guide only at certain preselected locations.

The adjustable cam track of Brun, Jr., et al., has been used in the manufacture of parisons for containers at rates that required special handling of the parisons upon their removal from the mold core assembly. This special handling was accomplished with a molded article receiver assembly that was movable into the interval between the mold cavity assembly and the mold core assembly when the mold was in an open position such as that disclosed in Delfer III, U.S. Pat. No. 4,721,452. Ideally, the movement of the stripper assembly relative to the mold core assembly inserted the parisons into the molded article receiver assembly and the release of the parisons by the pair of space defining surfaces occurred only when the parisons were properly located in the molded article receiver assembly. However, as a practical matter, even slight misalignment between the mold core assembly and the molded article receiver assembly caused one or more of the parisons to be significantly damaged as they were inserted into the molded article receiver assembly. While substantial efforts were focused on insuring the proper alignment between the mold core assembly and the molded article receiver assembly during the movement of the stripper assembly, this did not always accomplish the desired end.

It is therefore desirable that each pair of space defining surfaces of the stripper assembly be allowed to separate slightly, but not entirely, from the molded articles so that the molded articles are only loosely retained in a prerelease position. This prerelease position allows some play in the position of the molded articles relative to the stripper assembly thus permitting some variation in position of the molded article receiver assembly at the time of introduction of the molded articles. Due to the variation in length of the molded articles, it is also desirable to modify or adjust the position of product release from the stripper assembly in relation to the position of onset of the prerelease position.

SUMMARY OF THE INVENTION

In accordance with the present invention, an adjustable cam track is provided that includes a prerelease position and includes provision for modifying or adjusting the position of product release from the stripper assembly in relation to the position of onset of the prerelease position. The adjustable cam track of the present invention can be used in conjunction with any mold assembly that includes a first mold portion, a second mold portion movable with respect to the first mold portion, a third mold portion movably interposed between the first and second portions, the third mold portion having at least one pair of space defining surfaces which together with the first and second mold portions defines, in a closed position, at least one space for receiving plastic material injected therein to form at least one molded article. The second and the third mold portions are movable away from the first mold portion to permit removal of the at least one molded article from the first mold portion, and the second mold and third mold portions are movable away from each other to remove the at least one molded article from the second mold portion.

The adjustable cam track of the present invention includes a guide coupled to the second mold portion, the guide defining a first portion of the adjustable cam track. A cam follower is engaged in the cam track and is coupled to the at least one pair of space defining surfaces of the third mold portion for causing relative movement of each pair of space defining surfaces as the third mold portion moves relative to the second mold portion. The cam follower is engaged in the first portion of the cam track when the mold portions are in the closed position. The first portion of the cam track also includes a ramp to an intermediate portion defining the prerelease position of each pair of space defining surfaces so that the at least one molded article is loosely retained by the space defining surfaces. The adjustable cam track of the present invention also includes a cam insert defining a second portion of the adjustable cam track. The path defined by the cam insert is generally a matter of choice of design except that it includes the point of release of the at least one molded article from the space defining surfaces. The cam insert is adjustably positionable with respect to the guide to adjust the point of release with respect to the ramp defining the onset of prerelease, thereby permitting the adaptation of the cam track to molded articles of a variety of sizes.

In a preferred embodiment, the guide and the cam insert of the adjustable cam track of the present invention include a set of interlocking lands and grooves providing continuous engagement during adjustment of the position of the cam insert relative to the guide. Preferably, the set of interlocking lands and grooves are provided on a first pair of confronting walls, and the guide includes an undercut at the base of another wall, and the cam insert includes an outwardly extending flange engaging the undercut to facilitate slidable adjustment of relative position between the guide and the cam insert.

Also, in a preferred embodiment, the adjustable cam track of the present invention includes a first toothed rack fixed to the cam insert. A second toothed rack is coupled to the guide and engages the first toothed rack to fix the position of the cam insert relative to the guide only at certain preselected locations.

Additionally, in a preferred embodiment, the adjustable cam track of the present invention is constructed so that one of the guide and cam insert includes at least one index mark, and the other of the guide and cam insert includes a plurality of graduation marks alignable with the at least one index mark to indicate a selected position of said point of release.

Other features and advantages of the present invention will become apparent to those skilled in the art upon consideration of the following description of the illustrated preferred embodiment shown in the accompanying figures showing the best mode of the present invention as understood by the inventors.

BRIEF DESCRIPTION OF THE DRAWINGS

FIG. 4 is an end elevation view of the adjustable cam track taken from the right side of FIG. 3.

FIG. 5 is a sectional view taken along line 5—5 of FIG. 3.

FIG. 6 is a sectional view taken along line 6—6 of FIG. 3.

DESCRIPTION OF THE PREFERRED EMBODIMENT

Figure 1:
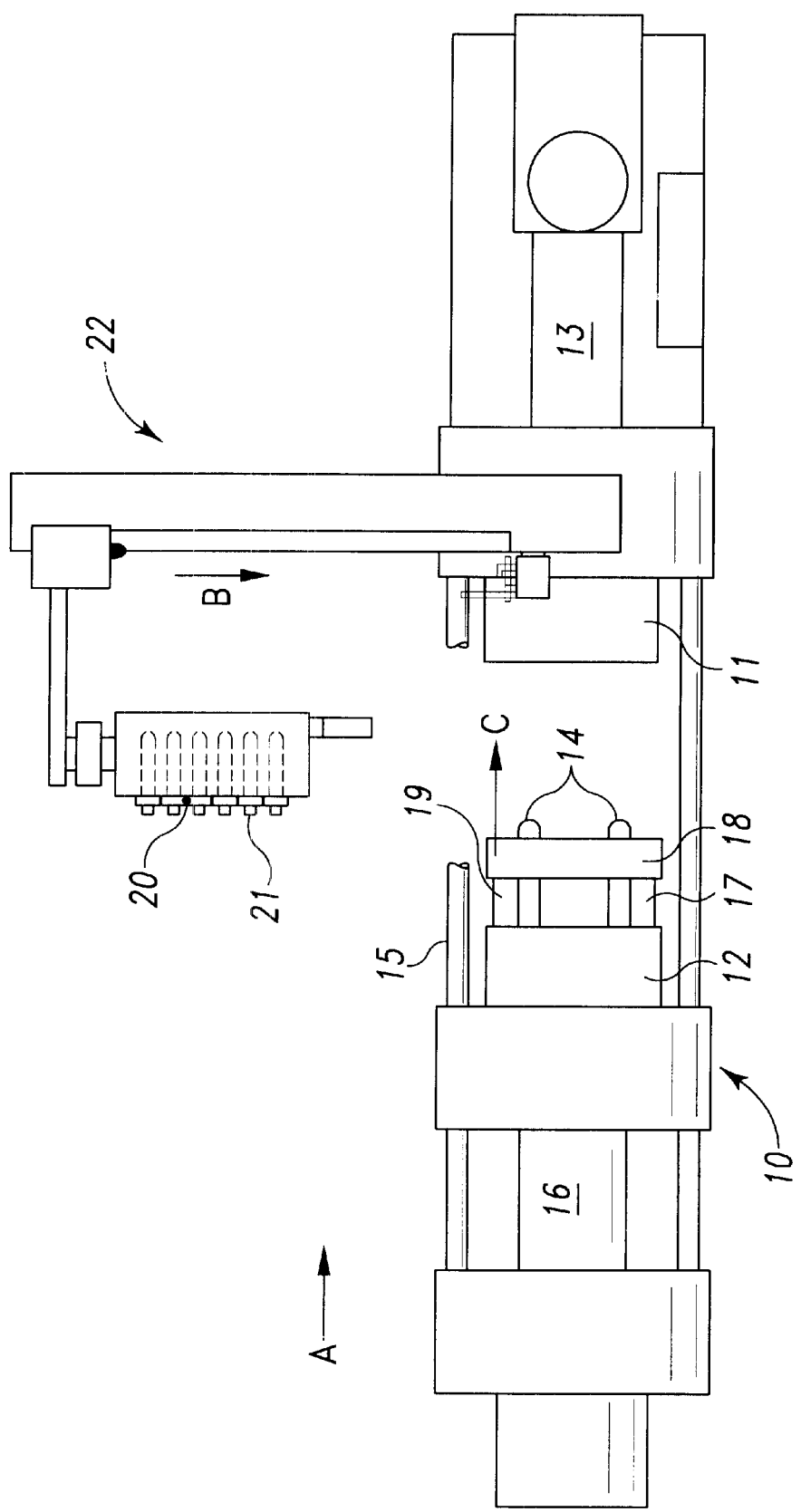
FIG. 1 is a plan view of an injection molding machine and molded article receiver assembly, the molding machine having a mold with an adjustable cam track of the present invention.

A plastic article molding machine 10 is shown in FIG. 1 to include a first mold portion 11 which contains a plurality of cavities and a second mold portion 12 which includes a like plurality of cores 14, the number of cores corresponding to the number of cavities. A third mold portion 18 is situated between the first and second mold portions 11 and 12, and includes a plurality of pairs of space defining surfaces that surround each of the cores 14. The mold portions 11, 12 and 18 are shown in an "open" position. The second and third mold portions 12 and 18 are movable in the direction A into engagement with the first mold portion 11 in a "closed" position to form a plurality of spaces for receiving molten plastic from the extruder 13 to form a plurality of plastic articles 21 by injection molding in the conventional manner. The number of articles 21 formed in an injection molding cycle will depend on the number of cavities and cores included in the mold portions 11 and 12. The mold portions 12 and 18 reciprocate on tie rods 15 powered by any convenient motive means, such as by hydraulic cylinder 16, in a pre-determined cycle.

Subsequent to the formation of the plastic articles 21 by the injection of molten plastic, the mold portions 12 and 18 move away from mold portion 11 and toward the open position together as a unit with the formed plastic articles 21 on cores 14. Retention of the plastic articles is aided by shrinkage of the articles onto cores 14. When in the open position, an interval is created between the cavity mold portion 11 and the cores 14 to permit the insertion in the direction B of an article carrier plate 20 of a molded article retrieval apparatus 22. The article carrier plate 20 can be provided with one or more sets of receivers for receiving the molded plastic articles 21, each set of receivers being equal to the number of cores 14 on mold portion 12. Removal of the plastic articles 21 from cores 14 onto the article carrier plate 20 is accomplished by the movement of the third mold portion 18 in the direction C toward the interposed article carrier plate 20. During such movement, the pairs of space defining surfaces, which surround each of the cores 14 and engaging each of the molded articles, strips the molded articles from the cores and into the waiting receivers of the article carrier plate 20. To enhance the reliability of successful placement of the molded articles into the receivers of the article carrier plate 20, the spacing of the pairs of space defining surfaces are controlled by adjustable cam track assemblies 17 and 19.

Figure 2:
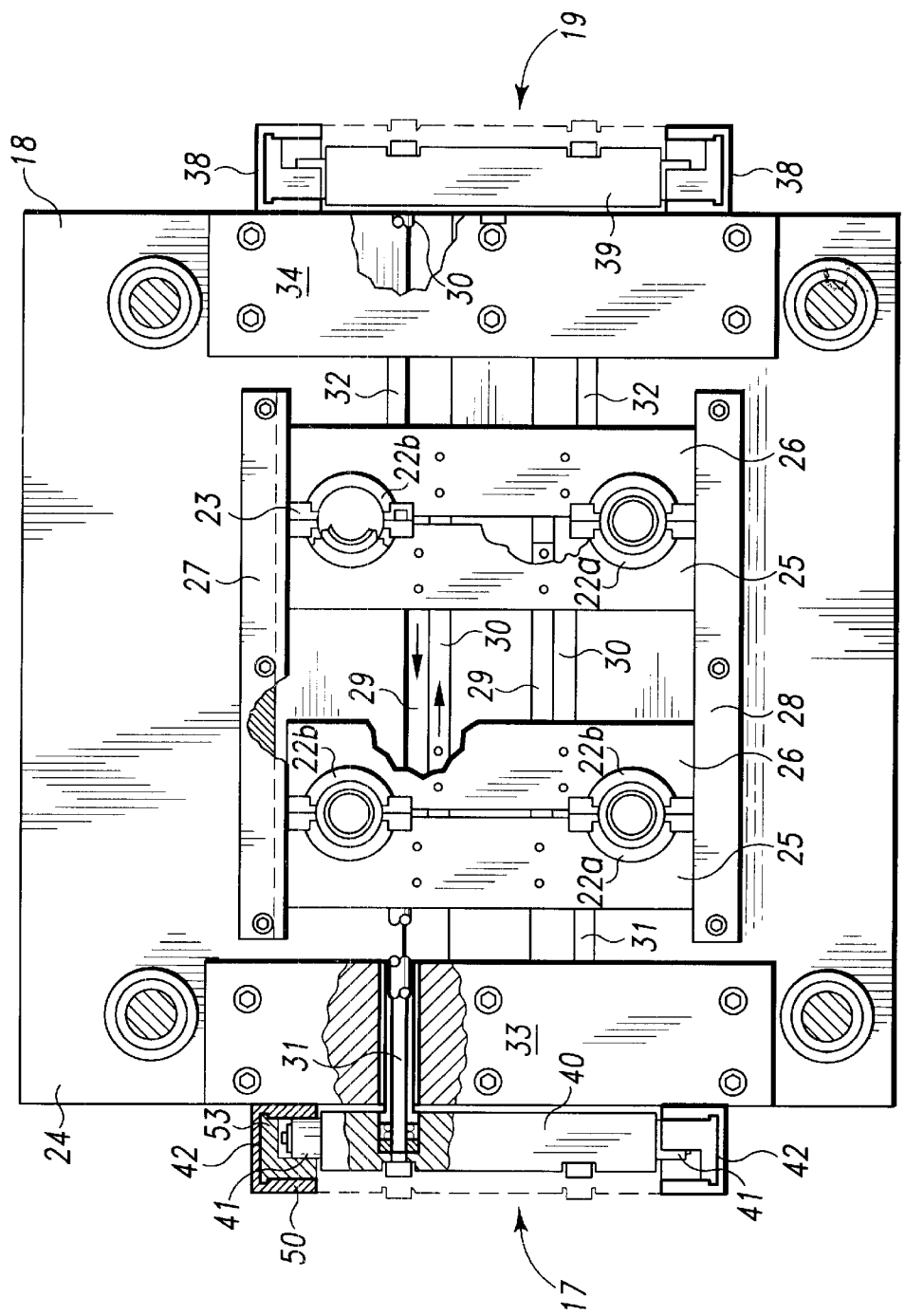
FIG. 2 is a view taken along line 2—2 of FIG. 1 showing pairs of space defining surfaces of the third mold portion and related cam.

FIG. 2 shows the face 24 of the third mold portion 18 confronting the mold cavity portion 11. A plurality of pairs of space defining surfaces 22a and 22b, commonly known in the trade as "thread splits" are mounted to the face 24. The thread splits 22a and 22b cooperate with the core 14 and cavity to complete the definition of the space which receives the plastic forming article 21. The space defining surfaces 22a and 22b hold the articles 21 as they are stripped from the core 14. Each half 22a and 22b of the thread split is mounted to separate slides 25 or 26 by clamps 23. The slides 25 and 26 reciprocate laterally within channels defined by brackets 27 and 28. While FIG. 2 shows four such sets of thread splits, it will be appreciated that the number of sets is a matter of choice of design and depends directly on the number of cores 14 on core mold assembly 12.

The slides 25 are secured together by tie members 29 while slides 26 are tied together by tie members 30 such that the lateral movement of all slides 25 or 26 is uniform and coordinated. The lateral movement of slides 25 and tie members 29 is caused by actuating rods 31 which extend through block 33 secured to the face 24 of the stripper mold portion 18. The actuating rods 31 are coupled to beam 40 which has at each end a roller which comprises a cam follower 41 situated in tracks 42 of the adjustable cam track assembly 17 which is fixed to the mold core assembly 12. Similarly, the lateral movement of slides 26 and tie members 30 is caused by actuating rods 32 which extend through block 34 secured to the face 24 of the stripper mold portion 18. The actuating rods 32 are coupled to beam 39 which has at each end a roller which comprises a cam follower 41 situated in a track 38 of adjustable cam track assembly 19 which is fixed to the mold core assembly 12.

As the stripper mold assembly 18 is caused to move with respect to the core mold assembly 12 by a suitable motive means, the rollers 41 proceed along the channel defined by the cam track 42. At a desired location, the cam tracks 42 and 38 are so configured as to cause the beams 39 and 40 to move from the position illustrated in FIG. 2 in solid lines outward to the position shown in phantom. This outward movement of beams 39 and 40 pulls the actuating rods 31 and 32 outward which in turn caused the slides 25 and 26 to move away from each other thereby separating the halves of the thread splits 22a and 22b from each other and releasing the part held by the thread splits.

The cam tracks 42 and 38 are substantially identical to, or mirror images of, each other, and are desirably adjusted so that the forces applied by the cam tracks on the cam followers at the ends of the beams 39 and 40 are all identical to each other. This arrangement eliminates any undesirable torque and imbalance in wear that might otherwise occur. The cam tracks 38 and 42 also include features shown in greater detail in FIGS. 3–6 that define a prerelease position for the beams, actuating rods and slides whereby the molded articles 21 are loosely retained by the thread splits 22a and 22b over an adjustable range of positions to achieve insertion of the molded articles 21 into the article receivers of the article carrier plate 20 despite some small misalignment between the cores 14 of the mold core assembly 12 and the article receivers of the carrier plate 20.

The adjustable cam tracks 38/42 each comprise a channel shaped guide 50 that is anchored to an adjacent portion of mold core assembly 12 by fasteners 51 shown penetrating through a suitable spacer 52. The dimensions of the spacer are a matter of choice of design to allow suitable positioning of the guide 50. The guide 50 slidably receives a cam insert 53. The relative positioning of the cam insert 53 with respect to the guide 50 is achieved by including a first toothed rack 54 in cam insert 53. Once the cam insert 53 is suitably positioned within guide 50, a second toothed rack 55 is secured to guide 50 to intermesh with toothed rack 54 to fix the position of the cam insert 53. While the toothed racks 54 and 55 are shown to be secured in position by a retainer plate 36 and various threaded fasteners, other suitable fastening means can be provided.

The guide 50 is shown to include in cross-section a generally U-shaped channel 56, the channel having an open end 57 and a closed end 58. The U-shaped channel 56 is defined by an upper wall 59, a back wall 60, and a lower wall 61. The upper wall 59 includes an under cut channel 62 that receives a protruding flange 63 of insert 53. A portion of the lower wall 61 adjacent to end 57 includes a plurality of grooves 64 separated by lands 65 that intermesh with corresponding lands 66 and grooves 67 on a lowermost surface 68 of cam insert 53.

Figure 3:
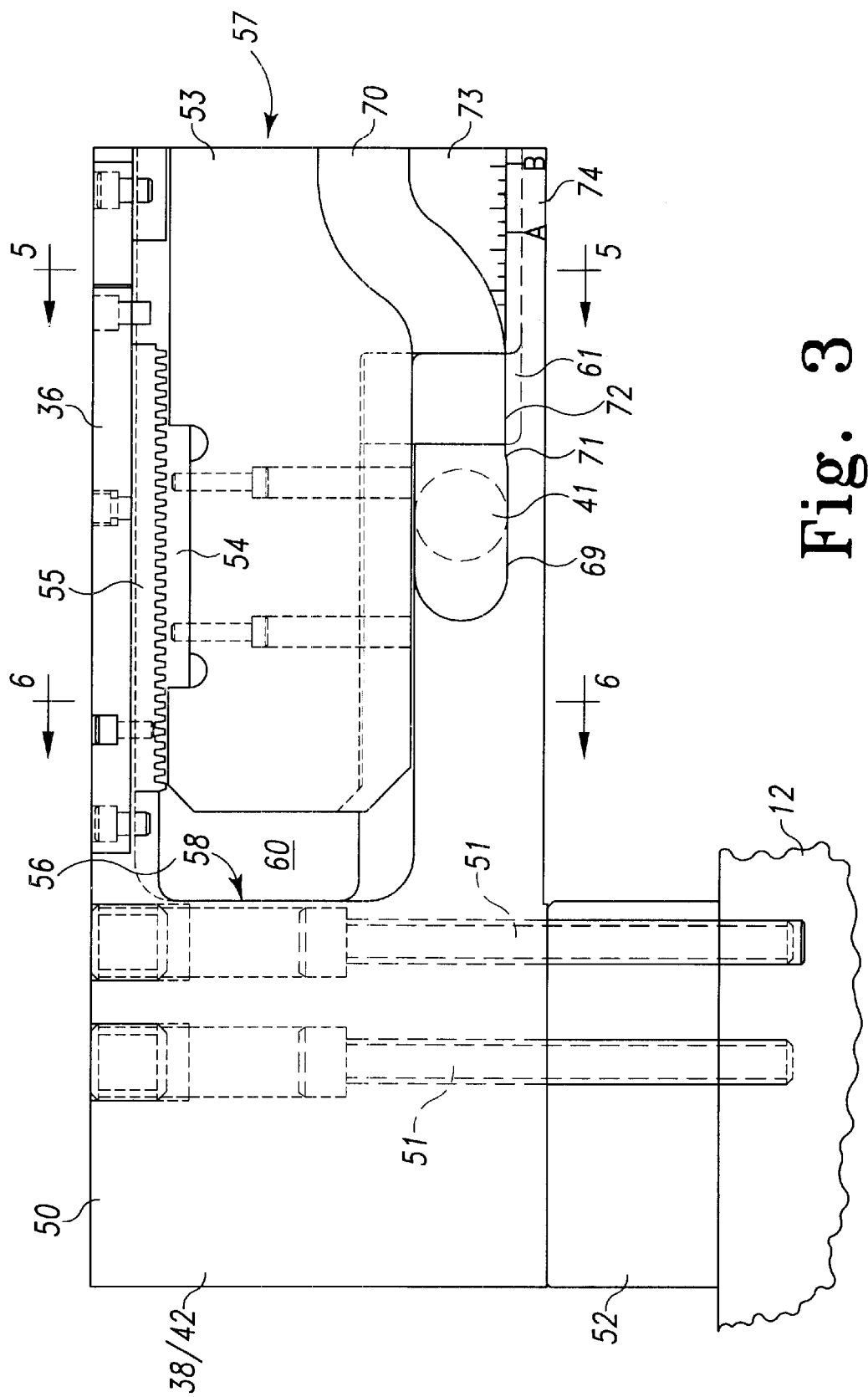
FIG. 3 is a side elevation view of an adjustable cam track of the present invention coupled to adjacent structure.

The cam insert 53 includes a canal 70 sized to receive the cam follower 41 and shaped to move the beams, actuating rods and slides to release the molded articles 21 as the cam follower 41 arrives at end 57. The exact shape of the canal 70 is a matter of choice of design and can include both linear and curved portions to obtain the desired movement of the beams, actuating rods and slides moving the thread splits 22a and 22b. As shown in FIG. 3, the left end portion 69 of lower wall 61 defines the portion of the cam track receiving the cam follower 41 when the mold portions 11, 12 and 18 are in the closed position. The lower wall 61 of guide 50 also includes a ramp 71 to an intermediate portion 72 defining the pre-release position of the pairs of thread splits 22 or other space defining surfaces so that the molded articles 21 are loosely but securely retained as the articles are inserted into the article receivers of the carrier plate 20. The ramp 71 can be a small incline separating the first portion 69 of the cam track from the intermediate portion 72 by as little as 0.75 mm and as much as the height of the lands 65. The ramp 71 must be positioned so that the cam insert 53 can be adjusted over the full range of available positions without overriding the ramp 71. The adjustment in position of the cam insert 53 has the effect of adjusting the release point, defined by the portion of canal 70 adjacent to end 57, with respect to the pre-release onset, thereby allowing adjustment of the article insertion range, which is desirably subject to change with changes in length of the molded article 21.

The face 73 of cam insert 53 includes graduation markings which, in cooperation with reference marks 74 on wall 61 of guide 50, can be employed to accurately position the insert 53 with respect to the guide 50 in the event that means other than the toothed racks 54 and 55 are employed to fix the position of the cam insert 53 relative to the guide 50. Desirably, all four of the cam inserts 53 of the cam tracks 38/42 are identically positioned to coordinate the operation of all of the cam followers 41 causing simultaneous outward motion of beams 39 and 40, thereby avoiding undesired strains and wear on the molded part release mechanism.

Although the invention has been described in detail with reference to the illustrated preferred embodiment, variations and modifications exist within the scope and spirit of the invention as described and as defined in the following claims.

What is claimed is:

1. An adjustable cam track for a mold assembly, the mold assembly including a first mold portion, a second mold portion movable with respect to the first mold portion, a third mold portion movably interposed between the first and second portions and having at least one pair of space defining surfaces which together with the first and second mold portions defines in a closed position at least one space for receiving plastic material injected therein to form at least one molded article, the second and the third mold portions being movable away from the first mold portion to permit removal of the at least one molded article from the first mold portion, the second mold portion being movable away from the third mold portion to remove the at least one molded article from the second mold portion, the adjustable cam track comprising:

a guide coupled to the second mold portion, the guide defining a first portion of the adjustable cam track;

a cam follower engaged in the cam track and coupled to the at least one pair of space defining surfaces of the third mold portion for causing relative movement of each pair of space defining surfaces, the cam follower being engaged in the first portion of the cam track when the mold portions are in the closed position, the first portion of the cam track also including a ramp to an intermediate portion defining a prerelease position of each pair of space defining surfaces so that the at least one molded article is loosely retained by the space defining surfaces; and a cam insert including a second portion of the adjustable cam track defining a point of release of the at least one molded article from the space defining surfaces, the cam insert being adjustably positionable with respect to the guide to adjust the point of release with respect to the ramp defining the onset of prerelease.

2. The adjustable cam track of claim 1 wherein the guide and the cam insert further comprise a set of interlocking lands and grooves providing continuous engagement during adjustment of the position of the cam insert relative to the guide.

3. The adjustable cam track of claim 2 wherein the set of interlocking lands and grooves are provided on a first pair of confronting walls, and the guide includes an undercut at the base of another wall and the cam insert includes an outwardly extending flange engaging the undercut to facilitate slidable adjustment of relative position between the guide and the cam insert.

4. The adjustable cam track of claim 1 further comprising a first toothed rack fixed to the cam insert, and a second toothed rack coupled to the guide and engaging the first toothed rack to fix the position of the cam insert relative to the guide only at certain preselected locations.

5. The adjustable cam track of claim 1 wherein one of the guide and cam insert includes at least one index mark, and the other of the guide and cam insert includes a plurality of graduation marks alignable with the at least one index mark to indicate a selected position of said point of release.

6. An adjustable cam track for an injection mold operable in an injection molding machine, the molding machine including a base, the mold including a first mold portion fixed to the base and including a mold cavity assembly, a second mold portion movable with respect to the base and first mold portion and including a mold core assembly, a third mold portion movably interposed between the first and second portions and having at least one pair of space defining surfaces which together with the mold cavity and mold core assemblies defines in a closed position at least one space for receiving plastic material injected therein to form at least one molded article, a first motive means for moving the second mold portion and the third mold portion away from the first mold portion to permit removal of the at least one molded article from the mold cavity assembly, and a second motive means for separating the second mold portion from the third mold portion to remove the at least one molded article from the mold core assembly, the adjustable cam track comprising:
 a guide fixed to the second mold portion for the movement of the third mold portion with respect to the second mold portion, the guide defining a first portion of a cam track;
 a cam follower engaged in the cam track and coupled to the at least one pair of space defining surfaces of the third mold portion for causing relative movement of each pair of space defining surfaces, the cam follower being engaged in the first portion of the cam track when the mold portions are positioned in the closed position to receive injected plastic material;
 a cam insert defining a second portion of the adjustable cam track engaging the cam follower at a point of release of the at least one molded article from the at least one pair of space defining surfaces of the third mold portion, the cam insert being adjustably positionable with respect to the guide to adjust the point of release position;
 a ramp included in the guide, the ramp leading from the first portion of the cam track to an intermediate portion defining a pre-release position of the at least one pair of space defining surfaces of the third mold portion so that the at least one molded article is loosely retained by the at least one pair of space defining surfaces.

7. The adjustable cam track of claim 6 wherein the guide and the cam insert further comprise a set of interlocking lands and grooves providing continuous engagement during adjustment of the position of the cam insert relative to the guide.

8. The adjustable cam track of claim 7 wherein the set of interlocking lands and grooves are provided on a first pair of confronting walls, and the guide includes an undercut at the base of another wall and the cam insert includes an outwardly extending flange engaging the undercut to facilitate slidable adjustment of relative position between the guide and the cam insert.

9. The adjustable cam track of claim 8 further comprising a first toothed rack fixed to the cam insert, and a second toothed rack coupled to the guide and engaging the first toothed rack to fix the position of the cam insert relative to the guide only at certain preselected locations.

10. The adjustable cam track of claim 9 wherein one of the guide and cam insert includes at least one index mark, and the other of the guide and cam insert includes a plurality of graduation marks alignable with the at least one index mark to indicate a selected position of said point of release.

11. An adjustable cam track used in an injection mold installed in an injection molding machine, the molding machine including a base, the mold including a first mold portion fixed to the base and including a mold cavity assembly, a second mold portion movable with respect to the base and first mold portion and including a mold core assembly, a third mold portion movably interposed between the first and second portions and having at least one pair of space defining surfaces which together with the mold cavity and mold core assemblies defines in a closed position at least one space for receiving plastic material injected therein to form at least one molded article, a first motive means for moving the second and the third mold portion away from the first mold portion by a sufficient distance to permit removal of the at least one molded article from the mold cavity assembly and defining an interval between the first mold portion and the at least one molded article, a molded article receiver assembly coupled to the base and movable into the interval between the first mold portion and the at least one molded article, and a second motive means for separating the second mold portion from the third mold portion to remove the at least one molded article from the mold core assembly and insert the at least one molded article into the molded article receiver assembly, the adjustable cam track comprising:
 a guide fixed to the second mold portion for the movement of the third mold portion with respect to the second mold portion, the guide defining a first portion of a cam track;
 a cam follower engaged in the cam track and coupled to the at least one pair of space defining surfaces of the third mold portion for causing relative movement of each pair of space defining surfaces, the cam follower being engaged in the first portion of the cam track when the mold portions are positioned in the closed position to receive injected plastic material;
 a cam insert defining a second portion of the adjustable cam track engaging the cam follower at a point of release of the at least one molded article from the at least one pair of space defining surfaces of the third mold portion, the cam insert being adjustably positionable with respect to the guide to adjust the point of release position so that the at least one molded article is securely situated in the molded article receiver assembly;
 a ramp included in the guide, the ramp leading from the first portion of the cam track to an intermediate portion defining a pre-release position of the at least one pair of space defining surfaces of the third mold portion so that the at least one molded article is loosely retained by the at least one pair of space defining surfaces as the at least one article is inserted into the molded article receiver assembly.

* * * * *